July 2, 1935.  C. H. NABER  2,006,473
ROAD SPREADER
Filed Oct. 17, 1931  3 Sheets-Sheet 1
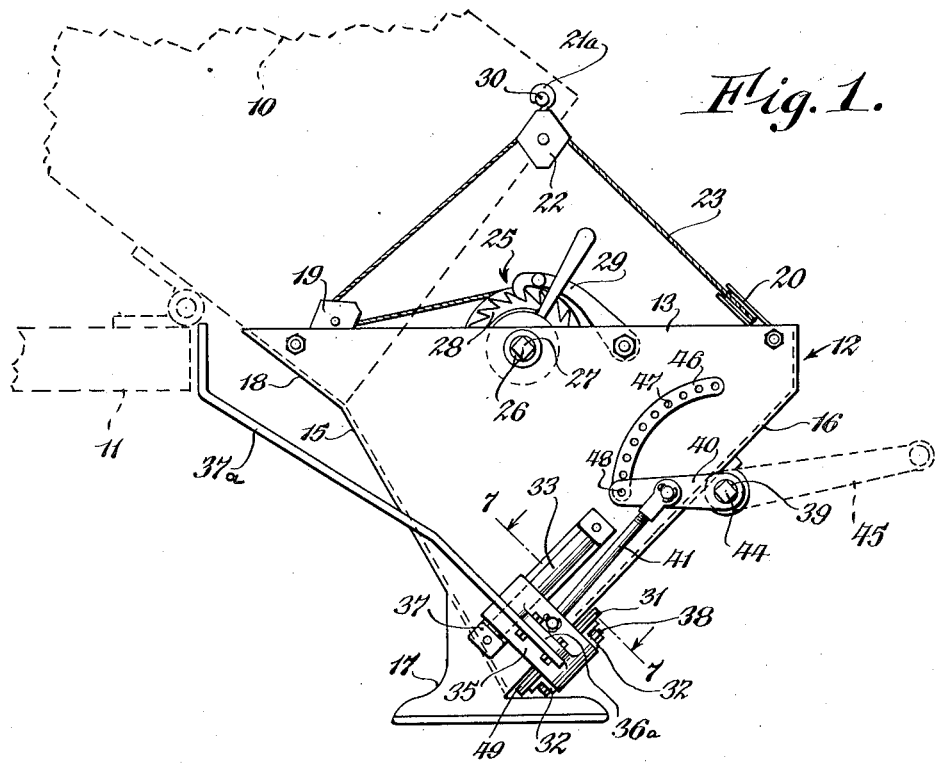

July 2, 1935.  C. H. NABER  2,006,473

ROAD SPREADER

Filed Oct. 17, 1931  3 Sheets-Sheet 2

INVENTOR
Claude H. Naber
BY Popp and Powers
ATTORNEYS

July 2, 1935.  C. H. NABER  2,006,473
ROAD SPREADER
Filed Oct. 17, 1931  3 Sheets-Sheet 3
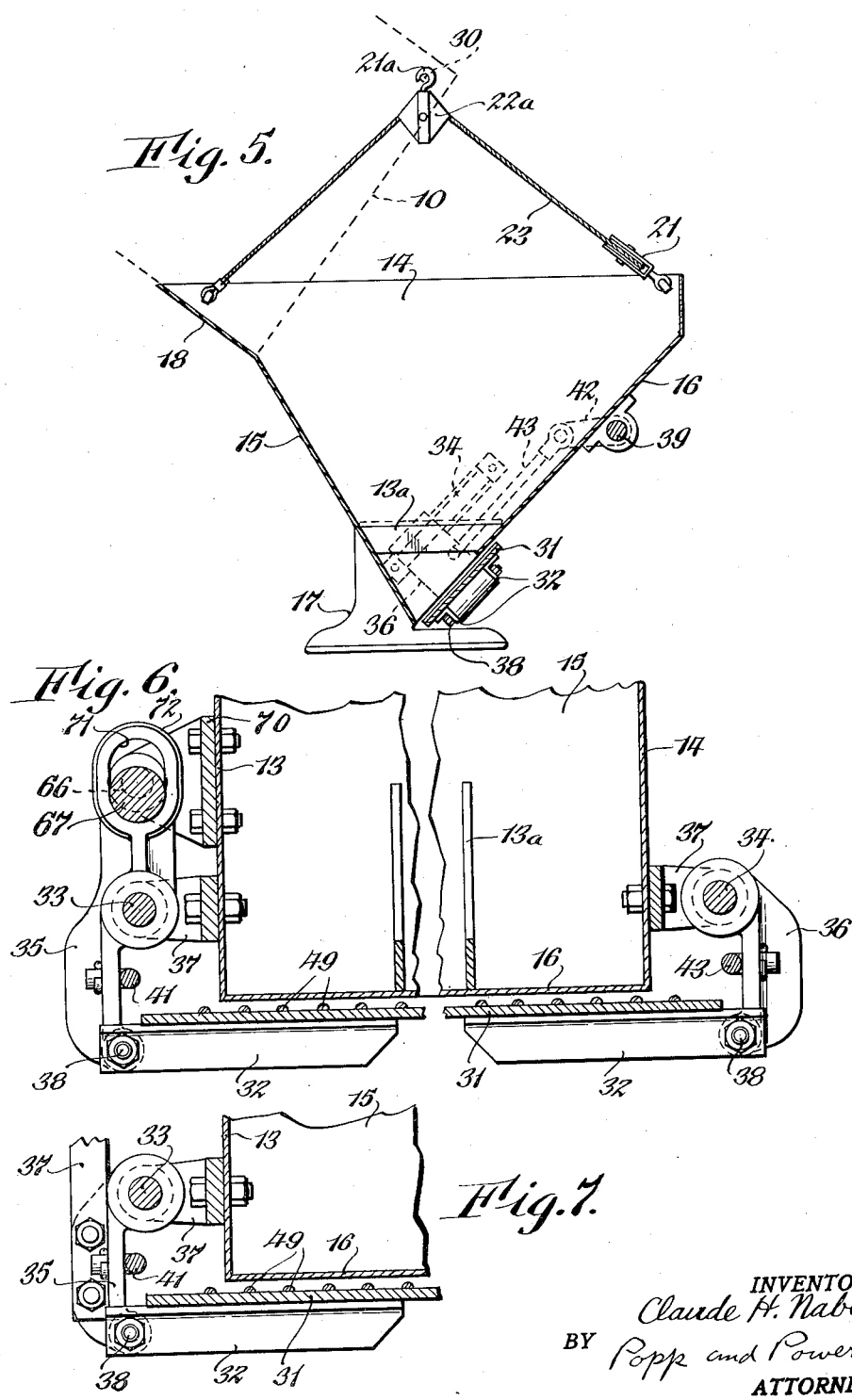

Patented July 2, 1935

2,006,473

UNITED STATES PATENT OFFICE 2,006,473

ROAD SPREADER

Claude H. Naber, Hamburg, N. Y., assignor to N & H Spreaders, Inc., Hamburg, N. Y., a corporation of New York Application October 17, 1931, Serial No. 569,482

5 Claims. (Cl. 275—2)

This invention relates to an improved material spreader which is designed for, but not necessarily limited to, use in connection with a dumping truck wherein the spreader is adapted to receive material such as crushed rock which is dumped from the truck body and to spread such material over a prepared surface. More particularly the invention is concerned with a spreader of the type which is provided with agitating means for maintaining material within the hopper in a loose condition and to insure a uniform and even distribution of the material.

In spreaders of the type generally described, it has heretofore been the practice to supply power mechanically to the agitating means either from the driving system of the truck or from the ground through an auxiliary wheel. It has also been the practice where the low cost of the spreader was essential, to provide means whereby the agitating means could be operated manually as, for example, by a workman. By virtue of the two types of power i. e. mechanical and manual for operating agitating means, it has been necessary, heretofore, to design the agitating means so that it would be suitable for the kind of power to be utilized in connection with it.

The principal object of the present invention is to provide a spreader of the type generally described in which the agitator is available for connection to power as from the driving system of the truck or the ground through an auxiliary wheel and which is also available for manual operation when the latter is desirable from a standpoint of economy or otherwise.

A further object is to provide a novel construction and arrangement of the parts of the spreader whereby the latter may be quickly and conveniently attached to or detached from the body of the truck by a single workman, the hopper of the spreader being formed to cooperate with the body of the truck so that upon its securement to the body it is supported thereby in a position best adapted for the purpose in view.

A still further object is to provide a novel mechanism for mechanically operating the agitator.

A still further object is to provide a construction wherein the agitator is not only availed of to loosen the material within the hopper and insure a uniform distribution of the material but is also utilized to regulate the width of the discharge opening.

A spreader embodying the features of the invention is illustrated in the accompanying drawings, wherein:—

Figure 1 is a side elevation of the spreader as attached to a truck, the latter being indicated in dotted lines. In this embodiment the agitator and associated parts are designed for manual operation.

Figure 2 is a top plan view of the spreader.

Figure 3 is a view similar to Figure 1, the spreader in this embodiment, however, being illustrated with auxiliary drive whereby the agitator may be mechanically operated.

Figure 4 is a fragmentary top plan view of the end of the spreader which includes the operating mechanism for the agitator.

Figure 5 is a transverse section throughout the hopper taken along line 5—5 of Figure 4.

Figure 6 is an enlarged fragmentary section taken along line 6—6 of Figure 3.

Figure 7 is a similar section taken along line 7—7 of Figure 1.

The spreader, as illustrated, may be employed in connection with a truck of any preferred type including a body 10 and a chassis 11. It comprises a hopper 12 of any suitable construction, the construction shown consisting of vertical side walls 13 and 14 and inclined front and rear walls 15 and 16 respectively, all of which are suitably secured together. The lower marginal edges of said front and rear walls are spaced apart to provide a discharge or outlet opening from which the material emerges as it is delivered to the road or other desired surface. The hopper is reinforced adjacent the discharge or outlet opening by suitable bars 13a which are arranged over the said opening and which are suitably connected at their ends to the front and rear walls 15 and 16. The side walls 13 and 14 are preferably formed to extend below the said front and rear walls to provide suitable legs 17, whereby the hopper when detached from a vehicle may be rested in an upright position so as to facilitate its subsequent attachment to a vehicle when desired.

In accordance with the invention the entire weight of the hopper and its contents is supported from the body of the truck regardless of whether the agitator is to be operated mechanically or manually. To this end, the front wall 15 of the hopper is formed with an angular extension 18. The length of the hopper is such that the end of the truck body can be accommodated between the side or end walls 13 and 14 while the extension 18 of the front wall 15 is formed at an angle such that when drawn tightly against the bottom of the truck body, the latter being inclined in the position to which it is moved to effect discharge of its contents by gravity, the hopper is in a substantially upright or vertical position. The hopper, as illustrated, is secured to the body of the truck in the position described by suitable pulleys 19 and 20 carried by the side wall 13 of the hopper and a similar pulley 21 carried by the side wall 14 (see Figure 5). The said pulleys cooperate with a pair of pulleys 22 and 22a and a cable 23, the former may be conveniently connected to and disconnected from suitable U-bolts 30 carried by the truck body while the latter is suitably secured at one end to the side wall 14 of the hopper. From its fixed end, the cable passes over pulley 22a, under pulleys 21 and 20, over pulley 22, under pulley 19 and about the drum 24 of a windlass 25. The latter is suitably mounted upon the side wall 13 and the shaft 26 by which the drum is operated extends through the said wall and is formed at its outer end as at 27 to cooperate with a suitable operating handle. A ratchet wheel 28 is fixed to the shaft 26 for rotation with the drum 24, which ratchet wheel cooperates with a dog 29 mounted upon the side wall 13 to prevent unwinding of the cable 23 when once the hopper has been secured to the truck body in the manner desired. In this connection, it is to be noted that the entire weight of the hopper and its contents is supported by the pulleys 22, the latter being provided with suitable hooks 21a so that they may be conveniently connected to and disconnected from the U-bolts 30.

The spreader may be conveniently attached to a truck by a single workman. This may be easily accomplished by unwinding a sufficient length of the cable 23 from the drum 24 to enable the hooks 21a of the pulleys 22 and 22a to be connected to the U-bolts 30, without bodily lifting the hopper, it being understood that the hopper is maintained in an upright position during this operation by the legs 17. Upon operation of the windlass 25, assuming the body of the truck is in the position indicated in dotted lines in Figure 1, the hopper is drawn up against the truck body in the manner shown in this figure, in which position the legs 17 are supported a substantial distance above the plane occupied by the wheels of the vehicle.

The discharge of material from the hopper through the discharge opening provided by the lower margins of the front and rear walls 15 and 16 respectively is regulated by a gate 31. The latter is provided with spaced angle members 32 which extend beyond the said ends. The gate 31 is supported by means of these extensions from rods 33 and 34 by arms 35 and 36, respectively. The rods 33 and 34 are secured by suitable brackets 37 to and in spaced relation from the respective side walls 13 and 14, the said rods being substantially parallel to the rear wall 16 of the hopper. The arms 35 and 36 are pivotally connected at their lower ends to the extensions provided by the angular members 32 by bolts 38. The said arms are also pivotally mounted upon the rods 33 and 34. In this instance, however, it will be noted that the arms are also mounted for sliding movement upon the said rods. The latter are of such a length as to permit movement of the gate 31 between predetermined limits in one of which the discharge opening is substantially closed by the gate and the other of which the discharge opening is substantially unobstructed by the gate. The arms 35 and 36 support the gate 31 in close proximity and substantially parallel to the wall 16.

Means is provided whereby the gate 31 may be adjusted in a plane substantially parallel to the plane occupied by the wall 16 to control the width of the discharge opening, it being understood that the quantity of material discharged from the hopper and hence the thickness of the layer depends upon the distance between the lower margin of the wall 15 and the lower margin of the gate 31. The means by which the latter is adjusted in the manner described includes a shaft 39 which is journaled in suitable bearings mounted upon the rear wall 16. At the end of the shaft 39 adjacent the side wall 13, the shaft carries an arm 40 which is connected intermediate its ends to a link 41. The opposite end of the link is connected to the arm 35. The other end of the shaft 39 carries an arm 42 which is connected by a link 43 to the arm 36. The shaft 39 is formed as at 44 (see Figure 1) to cooperate with a suitable crank 45. The latter may be operated to rotate the shaft 39, which movement is transmitted through arms 40 and 42 and links 41 and 43 to the opposite ends of the gate 31, whereby the latter may be adjusted to regulate the flow of material from the hopper.

In order to secure the gate 31 in the position to which it is adjusted, the side wall 13 of the hopper carries an arcuate element 46 which is formed with a series of holes 47. The outer end of the arm 40 is formed with a hole 48 which is registerable with each of the holes 47. Thus, by the use of a pin or the like the arm 40 may be secured in any position at which the hole 48 registers with a hole 47.

In accordance with the invention, the gate 31 in addition to controlling the width of the discharge opening in the manner described is also availed of to maintain the material within the hopper in a loose condition and to insure a uniform flow of material from the discharge opening throughout its entire length. This is accomplished by vibrating the gate 31 in the direction of its length. In this connection, it will be understood that such vibratory movements are permitted by virtue of the pivotal connection between the arms 35 and 36 and the rods 33 and 34 upon which they are mounted as well as by virtue of the pivotal connection between the opposite ends of the said arms and the gate extensions. Although movement of the gate 31 in this manner requires that it be spaced slightly away from the wall 16 at the intermediate portions of its vibratory movements such spacing is not great enough to impair the desired manner of operation of the gate. The gate 31 is preferably formed or provided with ribs 49 which are arranged transversely of the discharge opening. The said ribs aid in loosening the material and also tumble the latter about so that its delivery through the discharge or outlet opening is facilitated.

In accordance with the invention, means is provided whereby the gate 31 may be vibrated by hand or mechanically. In order to enable vibration of the gate 31 by the former method the arm 35 (Figures 1 and 2) is formed with a laterally projecting rib 36a which extends lengthwise of the arm. A handle 37a is suitably secured at its lower end to the rib 36a, the opposite end of the handle extending upwardly a distance sufficient to be within convenient reach of a workman standing in the vicinity of the hopper. It will be apparent that after the gate 31 has been adjusted to provide the desired width of discharge opening, and while the hopper is being carried along by the truck, the handle 37a may be operated by a workman to vibrate the gate 31 in the direction of its length thereby causing the material delivered to the hopper from the body of the truck to be distributed in a uniform layer of a predetermined depth.

The gate 31 may be operated mechanically if desired. Mechanism for operating the gate in this manner is illustrated in Figures 3 to 7 inclusive. The said means includes a wheel 58 which is adapted to frictionally engage the surface over which the truck is passing and is designed to slip should the material in the hopper obstruct the discharge opening in such a manner as to prevent the operation of the gate in the manner required. The wheel 58 is journaled in a bracket 59 which in turn is loosely or pivotally mounted on a shaft 60. The latter carries a sprocket 61 on its outer end and a beveled gear 62 on its inner end. The sprocket 61 is connected to a sprocket 63, carried by the wheel 58, by a chain 64. The beveled gear 62 meshes with a beveled gear 65 carried upon an extension 66 of a shaft 67. At its opposite end the shaft 67 carries a similar extension 66a. The extensions 66 and 66a are journaled in bearings 69 carried by a bracket 70. The said extensions are formed eccentrically of the shaft 67 and hence provide an eccentric mounting for the latter, it being noted that the said shaft is supported in spaced relation from the side wall 13 substantially parallel to the rod 33. The shaft 57 passes through an opening 71 formed in an extension 72 of the arm 35. It will be apparent that as the shaft 67 is rotated through the agency of the wheel 58, the arm 35 will be oscillated and that this movement will be transmitted to the gate 31 whereby the latter will be vibrated in the manner required. It will be noted that the shaft 67 is of such length as to cooperate with the extension 72 of the arm 35 in the various positions to which the latter may be adjusted upon the rod 33 in obtaining the required adjustment of the gate 31.

From the foregoing, it will be apparent that the gate 31 which is availed of to vary the width of the discharge or outlet opening of the hopper also serves to agitate the material within the hopper so that a uniform distribution of the material is insured. The construction, therefore, as compared to prior constructions is materially simplified. The manner in which the gate 31 is vibrated has the further advantage that the gate may be vibrated either mechanically or manually as desired. Hence, from a manufacturing standpoint spreaders constructed in accordance with the invention, regardless of the manner in which they are to be operated, may be substantally of standard construction. Where mechanical means is to be availed of in operating the agitator, it is only necessary to add the additional mechanism required for this purpose.

I claim:

1. In a spreader for attachment to a vehicle the combination of a hopper having side walls and inclined front and rear walls, the lower portion of the latter delimiting an outlet opening, a member adjacent said outlet opening, arms for carrying said member, guide elements carried by said hopper, said arms being pivotally mounted upon said elements and being pivotally connected to the ends of said member, means for moving said arms along said elements, whereby said member may be moved to vary the width of the outlet opening and means for rocking said arms upon said elements to vibrate said member in the direction of its length, thereby to agitate the material in the hopper adjacent the outlet opening.

2. In a spreader for attachment to a vehicle, the combination of a hopper having side walls and front and rear walls, the latter defining an outlet opening, a member adjacent said outlet opening, arms for carrying said member, guide elements carried by said hopper, said arms being pivotally mounted upon said elements and being pivotally connected to said member, means for moving said arms along said elements, whereby said member may be moved to vary the width of the outlet opening, a cam for rocking said arms to vibrate said member in the direction of its length and thereby agitate the material in the hopper adjacent the outlet opening, a wheel which engages the surface over which the vehicle passes and which is frictionally driven by such engagement and means connecting said wheel with said cam, whereby the latter is driven upon movement of the vehicle, thereby vibrating said member.

3. In a spreader for attachment to a vehicle, the combination of a hopper having end walls and inclined front and rear walls, said front and rear walls defining an outlet opening, a gate, elements secured to the end walls of said hopper, arms pivotally connected to the opposite ends of said gate and pivotally and slidably mounted upon said elements, means for moving said arms along said elements whereby to move said gate and to vary the width of the outlet opening and means for vibrating said gate in the direction of its length to agitate the material in the hopper adjacent said outlet opening.

4. In a spreader for attachment to a vehicle, the combination of a hopper having end walls and inclined front and rear walls, said front and rear walls defining an outlet opening, a gate, elements secured to the ends walls of said hopper, arms pivotally connected to the opposite ends of said gate and pivotally and slidably mounted upon said elements, means for moving said arms along said elements whereby to move said gate to vary the width of the outlet opening and means connected to one of said arms which is operable to vibrate said gate in the direction of its length to agitate the material in the hopper adjacent said outlet opening.

5. In a spreader for attachment to a vehicle, the combination of a hopper having end walls and inclined front and rear walls, said front and rear walls defining an outlet opening, a gate, elements secured to the end walls of said hopper, arms pivotally connected to the ends of said gate and pivotally and slidably mounted upon said elements, means for moving said arms along said elements whereby to move said gate to vary the width of the outlet opening and means for vibrating said gate in the direction of its length to agitate the material in the hopper adjacent said outlet opening, said means including a cam to which one of said arms is connected, said cam being so formed that the co-operating relation between it and said arm is maintained throughout the range of adjustment of said arms and means for driving said cam.

CLAUDE H. NABER.